Patented June 12, 1934

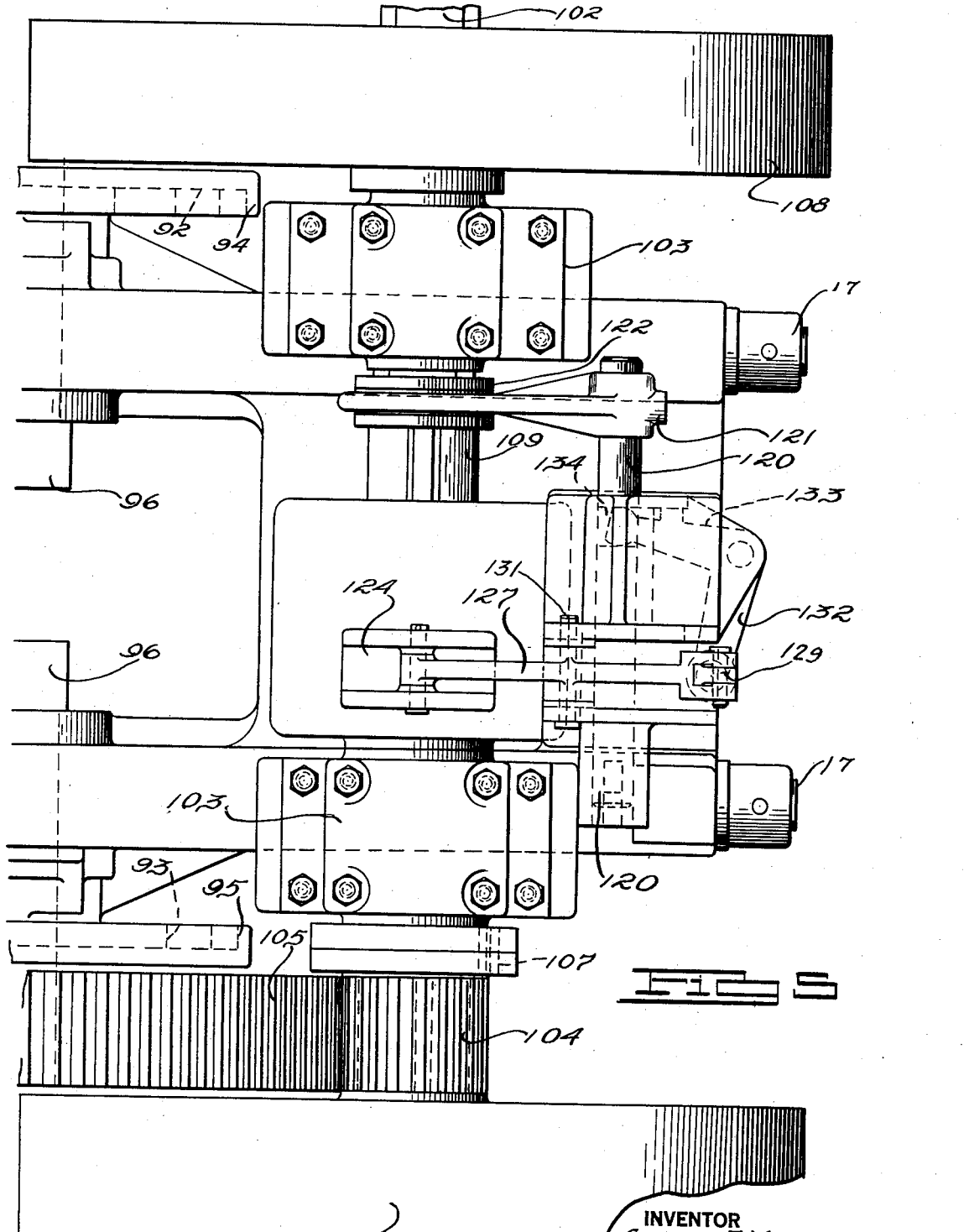

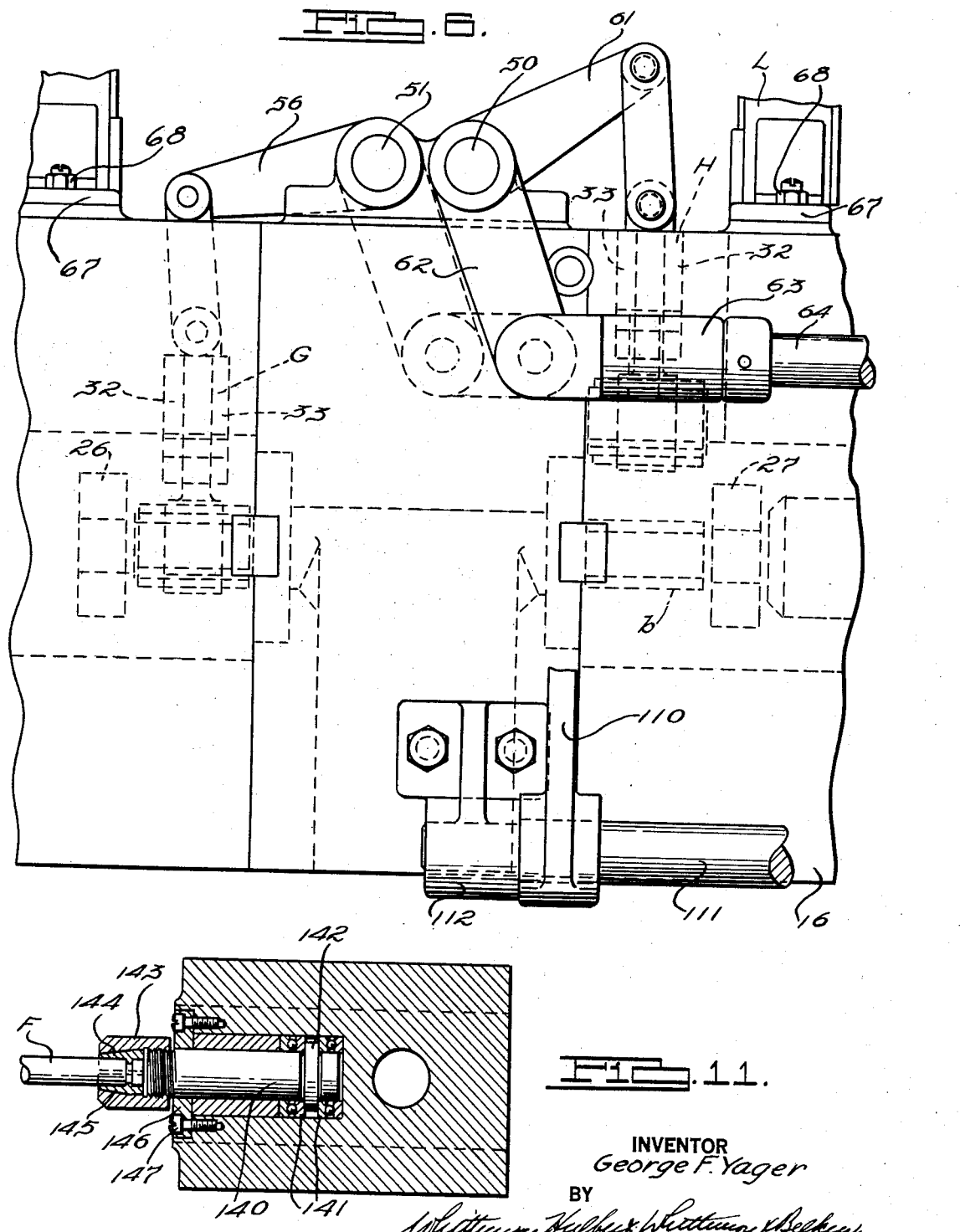

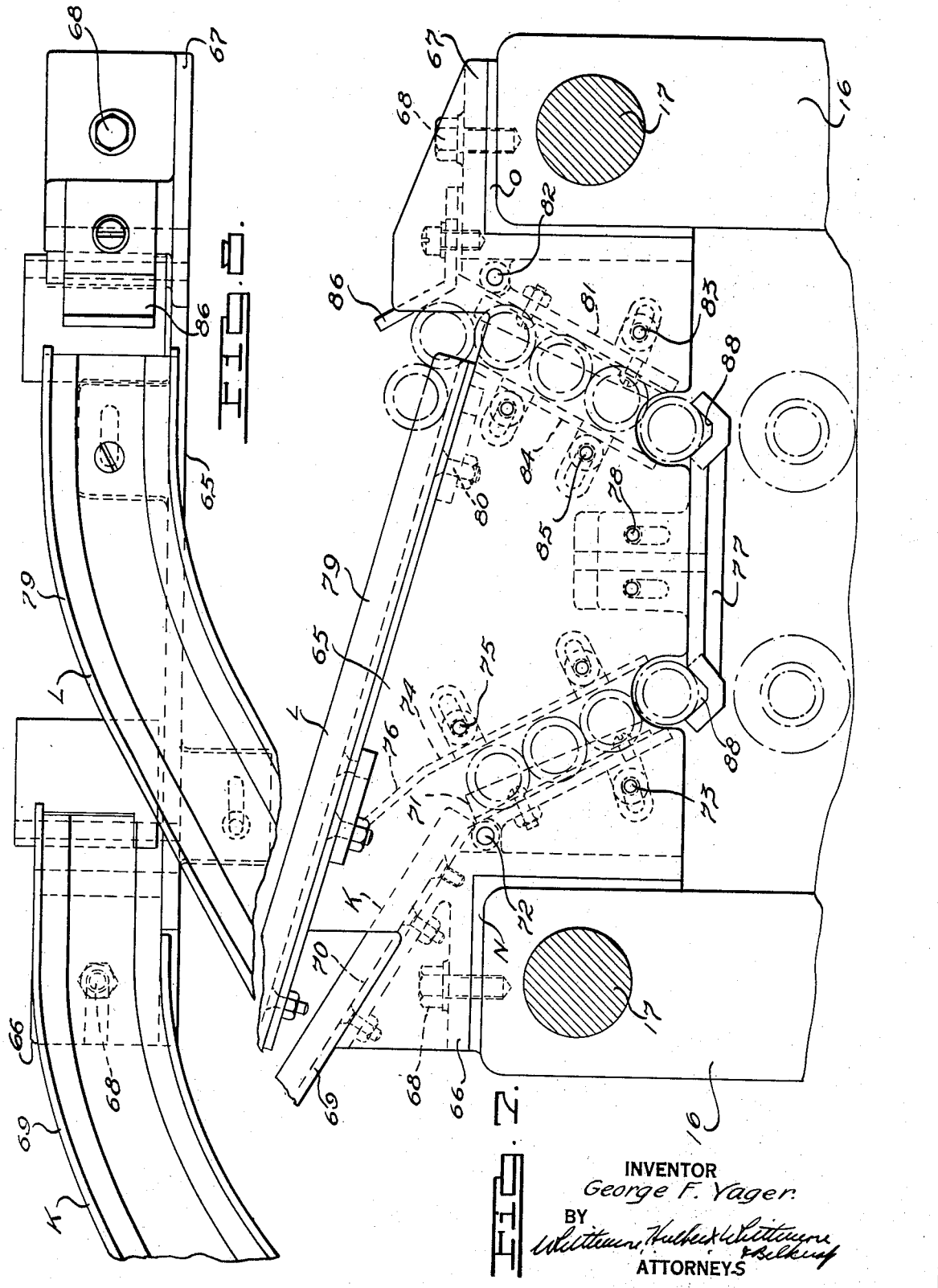

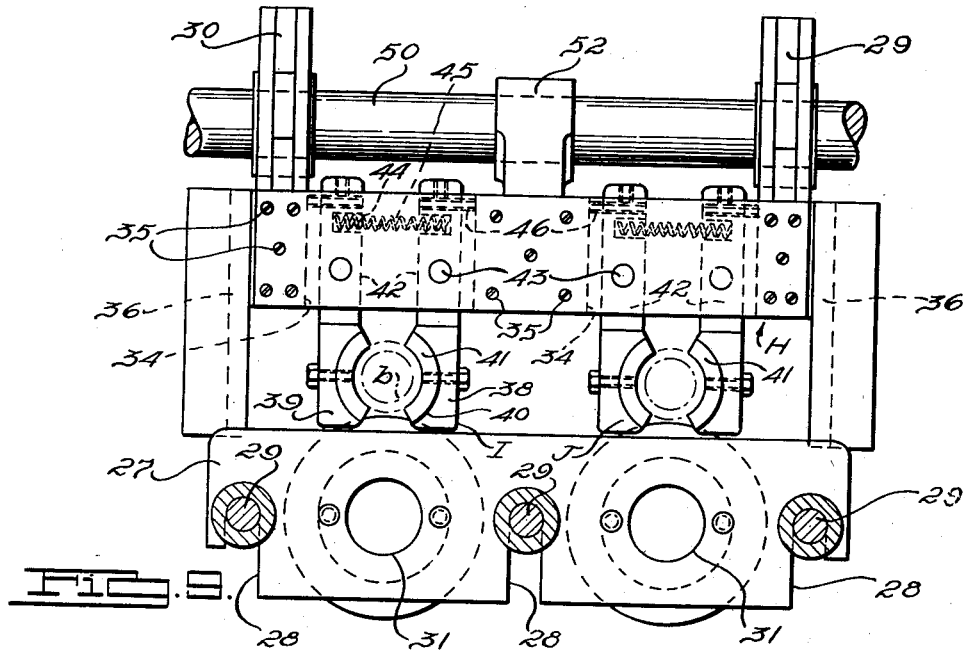
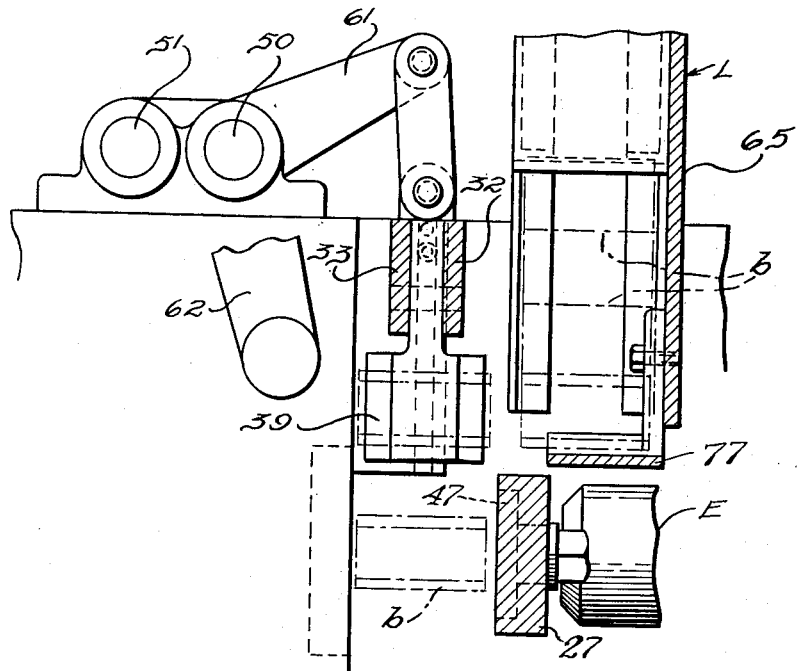

1,962,674

UNITED STATES PATENT OFFICE 1,962,674

BROACHING MACHINE

George F. Yager, Toledo, Ohio, assignor to The Bunting Brass and Bronze Company, Toledo, Ohio, a corporation of Ohio Application December 15, 1930, Serial No. 502,526

24 Claims. (Cl. 90—33)

This invention relates to broaching machines designed primarily for broaching bearings or like sections and has as one of its principal objects to expedite production by materially increasing the output of broaching machines and as a consequence cheapen the cost of manufacture.

The invention contemplates increasing the output of broaching machines and thereby materially expedite production by providing a machine having broaching means movable in opposite directions and engageable with an article to be broached during movement in both directions as distinguished from the usual type of machine wherein a complete cycle of operation of the broach is necessary to complete a single piece of work.

Another object of this invention which contributes materially to increasing the capacity of the machine resides in the provision of broaching mechanism of the type specified capable of broaching a plurality of bearings or like sections simultaneously at the end of each stroke.

A further advantageous feature of this invention resides in the means employed for positioning the bearing or like sections in operative relation to the broaching means for operation thereby upon movement of the same in opposite directions and the novel manner in which the sections are fed to the means aforesaid.

A further object of the present invention resides in the novel manner in which the bearing or like sections are stripped from the broaching members upon completion of the broaching operation.

A further object of the present invention is to provide braking mechanism for the machine automatically operable upon manipulation of the clutch for connecting and disconnecting the machine from the source of power. The arrangement is such that actuation of the clutch to disconnect the machine from the source of power automatically operates the braking mechanism to immediately bring the moving parts of the machine to rest.

With the foregoing as well as other objects in view, the invention resides in the peculiar construction of the machine and the simple and expedient manner in which the same performs the broaching operations.

In the drawings:

Figure 5 is a view similar to Figure 4 of another portion of the machine;

Figure 6 is a fragmentary side elevational view of the construction shown in Figure 4;

Figure 7 is a fragmentary side elevational view of the work feeding mechanism;

Figure 8 is a plan view of the construction shown in Figure 7;

Figure 9 is a semi-diagrammatic elevational view illustrating the work clamping means;

Figure 10 is a sectional side elevational view of the construction shown in Figure 9; and Figure 11 is a sectional view of the broach spindle assembly.

Figure 1:
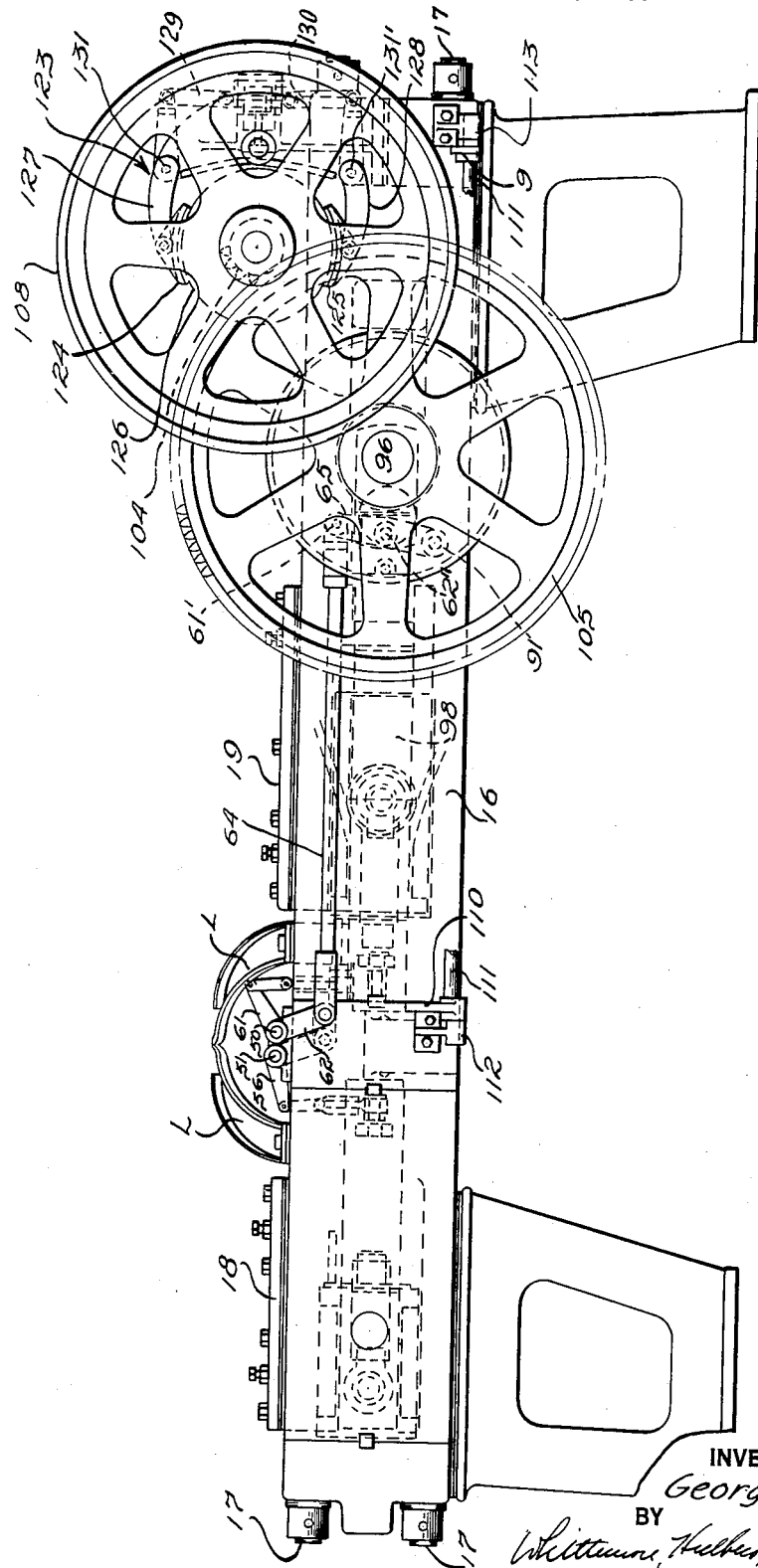
Figure 1 is a side elevation of a broaching machine constructed in accordance with this invention.

In general, the broaching machine illustrated herein is of the horizontal type comprising a pair of crossheads A and B spaced longitudinally of the machine and mounted for sliding movement on the latter as a unit. Each of the crossheads A and B is provided with broach collets D and E extending inwardly from the crossheads toward and in alignment with each other. The collets D and E are designed to detachably receive broaching members F which may be of any desirable construction.

Mounted for sliding movement upon the machine in a substantially vertical plane is a pair of work holding devices G and H. Each of the work holding devices G and H is provided with a pair of work clamping jaws I and J (Figure 9) adapted to yieldably clamp the work therebetween. The work holding devices G and H are positioned upon the machine in such a manner as to locate the jaws I and J in the space between the crossheads A and B and the jaws I and J of each holder are spaced laterally from each other a distance substantially equal to the space between the collets D and E with the result that when the holders are in their lowermost positions, the work supported by the jaws I and J is in accurate alignment with the broaching members carried by the collets. As will be more fully hereinafter described, the holders G and H are alternatively actuated in timed relation to the reciprocation of the crossheads and the arrangement is such that when the work holder G together with the clamping jaws I and J, carried thereby, are in their lowermost positions the work within each of the clamping jaws is accurately located for engagement by the aforesaid broaching members. As soon as the broaching members complete the broaching operation and prior to the completion of the broaching stroke of the crosshead A, the holder G moves upwardly disengaging the clamping jaws from the work supported by the broaching members and positioning the jaws in operative relation with the work feeding chutes K and L to be presently described. When the aforesaid clamping jaws I and J are in operative relation to the feeding chutes K and L, the pins M carried by the crosshead A above the broaching collets D and E engage the lowermost bearing section in each of the chutes and upon continued movement of the crosshead A in the aforesaid direction move the sections axially out of the chutes into engagement with the clamping jaws. When this operation is completed, the crosshead A is at the end of its forward stroke and in moving rearwardly to its position shown in Figure 2 disengages the broaching members from the work by suitable stripping mechanism to be presently described to permit the work to be discharged by gravity from the machine. During the aforesaid movement of the crosshead to its rearwardmost position, the holder G and accordingly the clamping jaws with the work therein are again moved downwardly so as to locate the work carried by the jaws in operative relation to the broaching members upon the crosshead A for the next operation.

Since the crosshead B is connected to the crosshead A for unitary movement therewith, it will be apparent that as the crosshead A is moved to its rearwardmost or inoperative position, the crosshead B moves in the direction of the arrow 15 to engage the broaching members carried thereby with the bearing or like sections clamped by the jaws I and J on the holder H. As soon as the broaching operation is completed, the holder H is moved upwardly to disengage the jaws from the bearing or like sections and position the same in operative relation to a second pair of work feeding chutes N and O. In this connection it is to be noted that the crosshead B also carries pins P similar to the pins M, described above, for engaging the lowermost bearing sections within the chutes upon continued movement of the crosshead B in the direction of the arrow 15 to move the sections in the chutes into engagement with the clamping jaws on the holder H. The crosshead B is then moved toward its inoperative position and the holder H is actuated to position the bearing or like sections carried by the clamping jaws in position for the next operation. Thus, from the brief description of the machine as outlined above, it will be apparent that I have materially expedited production by providing reciprocable broaching mechanism capable of broaching a plurality of bearings or like sections at the end of each stroke, thereby reducing lost motion of the broaching mechanism to a minimum.

Figure 2:
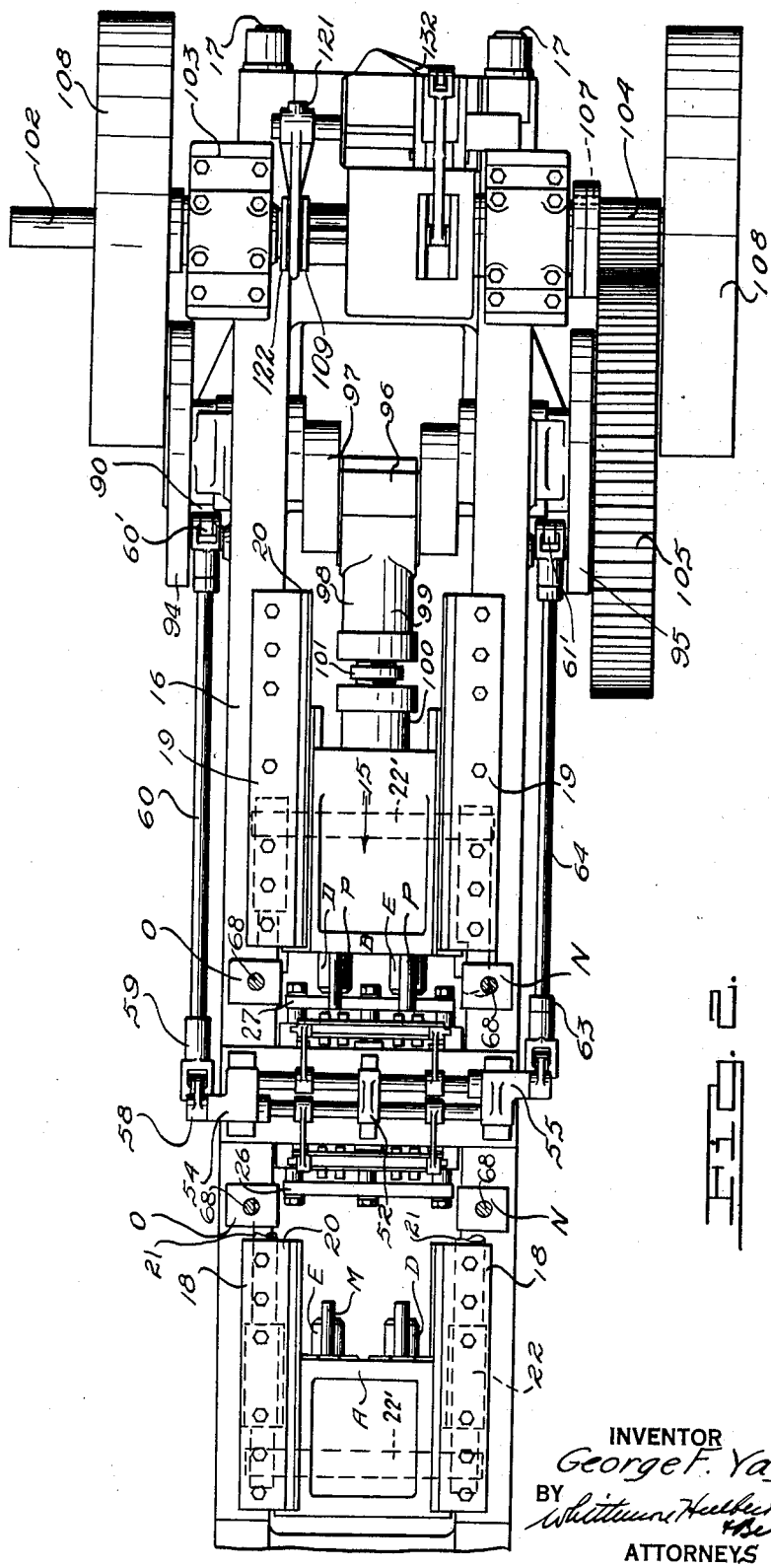
Figure 2 is a plan view of the construction shown in Figure 1.
Figure 4:
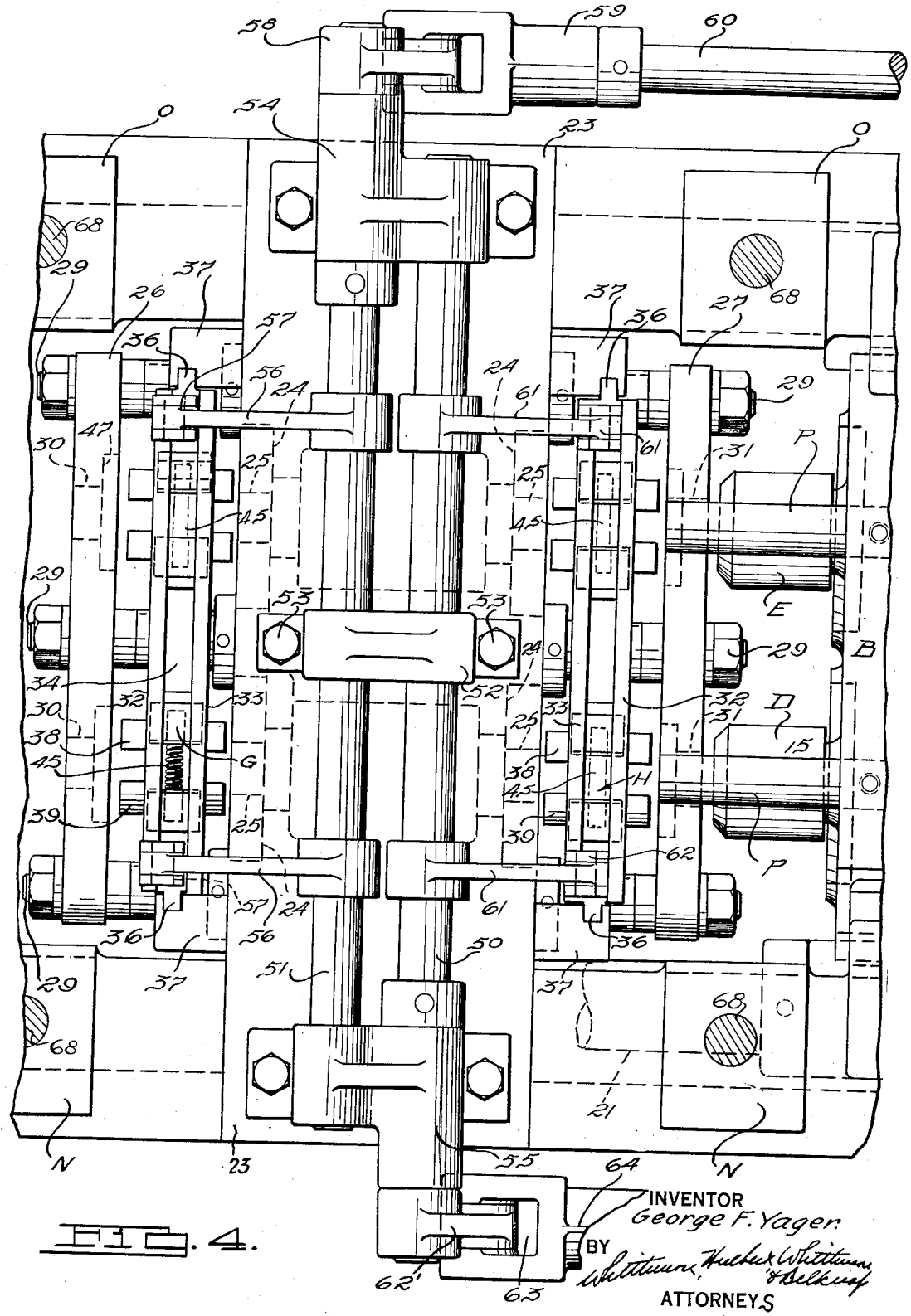
Figure 4 is an enlarged plan view of a portion of the machine.

Referring now more in detail to the particular construction of the machine illustrated herein, it will be noted that the same comprises a frame 16 formed of a plurality of sections so as to facilitate assembly and manufacture. The several sections of the frame are rigidly secured together in the assembled position of the machine by means of a plurality of tie rods 17 extending longitudinally of the frame as clearly shown in Figure 1 of the drawings. Secured to opposite sides of the machine frame are longitudinally spaced plates 18 and 19 having the inner edge portions 20 projecting inwardly from opposite sides of the frame and cooperating with suitable projections upon the frame to form longitudinally extending guides for slidably receiving opposite sides of the crossheads A and B. As previously stated, the crossheads A and B are spaced from each other longitudinally of the machine and, as shown in Figure 2, are connected together for unitary operation by means of the tie rods 21 arranged upon opposite sides of the crossheads. In detail, each of the crossheads A and B is provided with transversely extending pins 22' at the outer ends thereof projecting beyond opposite sides of the crossheads for pivotal engagement with suitable links 22. The links 22 are provided with tubular threaded portions for detachably engaging opposite ends of the tie rods 21. Thus, it will be seen that the crossheads A and B while spaced longitudinally of the machine from each other, are connected so as to move as a unit relative to the frame of the machine. Extending transversely of the machine frame intermediate the crossheads A and B is a partition 23 having bumper plates 24 embedded within opposite sides thereof. As shown in Figure 4, there are two bumper plates in each of the aforesaid sides of the partition spaced transversely from each other and provided with aligned openings 25 therethrough so arranged and of such diameter as to receive the free ends of the broaching members F. Spaced longitudinally of the machine from opposite sides of the partition 23 and within the boundaries of the machine frame are the stripper plates 26 and 27. The stripper plates 26 and 27 are identical in construction and are each provided with three longitudinally spaced downwardly opening slots 28 for detachably engaging a corresponding number of clamping bolts 29 extending laterally outwardly from opposite sides of the partition 23. Each of the stripper plates 26 and 27 is formed with laterally spaced openings 30 and 31 therethrough in alignment with the openings 25 in the bumper plates 24 and has a diameter corresponding to the diameter of the latter openings to permit the broaching members to pass therethrough.

Mounted for reciprocation in vertical planes between the stripper plates and the adjacent sides of the partition 23 are the work holders G and H. Each of the work holders G and H is formed of a pair of laterally spaced plates 32 and 33 secured in proper spaced relation to each other by means of the spacers 34 and clamping bolts 35. As shown particularly in Figure 9, I provide three spacers 34 for securing the plates in assembled relation, one at each end of the plates and one intermediate the ends of the latter. The spacers at the ends of the plates are provided with suitable tongues 36 slidably engaging cooperating grooves formed in guides 37 secured to opposite sides of the partition 23. As previously stated, there are two work clamping jaws I and J carried by each of the holders G and H and as shown in Figure 9, each clamping jaw is formed of cooperating jaw members 38 and 39 having arcuate portions 40 located below the work holders G and H and adapted to receive suitable inserts 41 which serve to engage opposite sides of the bearing or like section to clamp the same therebetween. The upper portions 42 of the jaw members 38 and 39 are located between the plates 32 and 33 within the space provided by the spacers 34. The portions 42 of the jaw members are pivoted intermediate the ends thereof to the plates 32 and 33 by means of the pivot pins 43 and are provided with aligned recesses 44 adjacent the upper ends for receiving the opposite ends of suitable coil springs 45. The arrangement is such that the coil springs 45 normally tend to rock the jaw members 38 and 39 about the pivots 43 for urging the inserts 41 into clamping engagement with opposite side portions of the bearings or like sections. Suitable stops in the form of pins 46 are arranged within the upper ends of the jaw members 38 and 39 and project laterally from the jaw members for engagement with the spacers 34 upon opposite sides of the same to limit movement of the work gripping portions of the jaws toward each other by the springs 45. The construction is such as to maintain the jaws I and J sufficiently separated to permit the pins M and P to transfer the bearings or like sections from the source of supply into operative engagement with the clamping jaws as hereinbefore stated.

The foregoing arrangement is such that when either of the work holders G and H are in operative position, the bearings or like sections will be supported by the jaws I and J between the partition 23 and stripper plates 26 and 27 with the opening through the bearings in direct alignment with the openings 25, 30 and 31. By way of explaining the operation of the various parts described above, it will be assumed that the work holder G and clamping jaws I and J carried thereby are in their operative position wherein the bearings or like sections are supported in direct alignment with the openings 25 and 30 in the bumper plates 24 and stripper plate 26, respectively. With the parts in the above position, it will be apparent that movement of the crosshead A in a direction toward the partition causes the broaching members carried by the crosshead to project through the openings 30 into engagement with the bearings clamped in the jaws I and J. Upon engagement of the broaching members with the bearing sections, the latter are moved axially of the clamping jaws I and J into engagement with the bumper plates 24 at which time the bearings are supported by the broaching members permitting the work holder to move upwardly to receive a second set of bearings as previously stated. When the broaching operation is completed and the pins M upon the crosshead function to transfer a set of bearings from the chutes to the clamping jaws I and J, the crosshead moves rearwardly toward its inoperative position. As the crosshead moves rearwardly, the bearing sections upon the broach are also moved rearwardly until the ends of the bearing sections engage the bumper plate in the counterbored surfaces 47 of the stripper plate at which time further movement of the broaches toward their inoperative position is effected relative to the bearings with the result that the latter are disengaged from the broach members and permitted to fall into a suitable discharge chute or other collecting means. It being understood from the foregoing description that as the crosshead A moves toward its inoperative position, the crosshead B is moved into operative position to engage the broaching members carried thereby with suitable bearings or like sections carried by the work holder H and since the parts of the machine associated with the crosshead B are substantially identical and function in the same manner as those previously referred to, it is believed unnecessary to describe the remaining cycle of operation of the machine. It should be understood, however, that the work holders G and H are actuated in timed relation to the reciprocation of the crossheads A and B and also that the work holders are moved upwardly to position the jaws carried thereby in operative relation to the supply chutes prior to the crossheads reaching the ends of their operative strokes so as to permit the pins M and P upon crossheads to automatically transfer the work from the chutes into clamping relation with the holders during the operative stroke of the crossheads.

Referring more in detail to the particular construction of both sets of chutes K and L for delivering the bearings or like sections in a position to be engaged by the clamping jaws I and J carried by the work holders G and H when the latter are in their uppermost position and with special reference to Figures 7 and 8, it will be noted that the chutes K serve to deliver the bearings to the clamping jaws I while the chutes L deliver the bearings to the clamping jaws J and since the construction of both sets of the chutes K and L is identical, only one set will be specifically described herein. One set of the chutes K and L is illustrated in Figure 7 of the drawings and as shown in this figure, the chutes K and L are secured to a suitable bracket member 65 extending transversely of the machine frame and having opposite end portions 66 and 67 secured to the pads N and O on opposite sides of the machine frame by means of the bolts 68. The chute K for delivering bearings to the jaw I comprises an inwardly and downwardly inclined runway 69 secured to the bracket 65 as at 70 and communicating at the lower end thereof with a runway 71 having the upper end of the same pivotally connected as at 72 to the bracket 65 adjacent the lower end of the runway 69. The lower end of the runway 71 is secured to the bracket as at 73 for adjustment in an arc described about the pivot point 72. The runway 71 is rather sharply inclined to insure proper feeding of the bearings and in order to prevent accidental movement of the bearings out of the runway, I provide a shield 74 secured as at 75 to the bracket for adjustment toward and away from the bearing sections. Thus, it will be seen that the shield serves to maintain the bearing sections within the runway 71 and is adjustable to compensate for bearings of different diameter. It will further be observed from Figure 7 that the shield 74 is provided with an angularly arranged extension 76 overlapping the lower end portion of the runway 69 so as to form an abutment for the bearing sections discharged from the runway 69 and direct these sections upon the runway 71. It is to be understood that the bearings are inserted within the runways with their axes arranged transversely to the runways so as to freely roll down the same. The runway 71 is adjusted by manipulating the fastening element 73 so as to deposit the bearings discharged therefrom upon the work supporting member 77 arranged below the bracket 65 and connected thereto as at 78 for adjustment in a vertical plane. The adjustment for the bearing support 77 permits accurately locating the same to support the bearings discharged from the runway 71 in proper relation to the gripping jaw I when the latter is in its uppermost position and also to the transfer pin carried by the crosshead.

The chute L for delivering bearings to the clamping jaw J is also secured to the bracket 65 and as will be observed from Figure 7 of the drawings, comprises a downwardly inclined runway 79 secured to the bracket 65 as at 80 and communicating at the lower end thereof with a second runway 81 which is inclined at an angle preferably corresponding to the inclination of the runway 71. The runway 81 is pivotally connected as at 82 to the bracket 65 and is secured to the bracket 65 for arcuate adjustment about the pivotal connection 82 by means of the fastener element 83. The runway 81 is also provided with a shield 84 which serves to maintain the bearings within the runway 81 and which is secured to the bracket 65 as at 85 for adjustment toward and from the runway 81 to compensate for various size bearing sections. A suitable abutment 86 is also suitably secured to the bracket 65 for engaging the bearings as they discharge from the runway 79 to direct the same into the runway 81. The lower end of the runway 81 terminates adjacent the support 77 so as to deposit the bearings upon this support which, as previously stated, is positioned in predetermined relation to the work holding means. In this connection it is to be noted that the bearing support is provided adjacent the opposite ends thereof with grooves 88 for receiving the lower portions of the bearings discharged by the runways 71 and 81. It is to be understood that the bearing support 77 is so adjusted relative to the bracket 65 that the bearings or like sections within the grooves 88 will assume a position in alignment with the clamping jaws when the latter are in their uppermost position with the result that when the bearing sections are moved axially by the transfer pins, they will be guided into engagement with the jaws by the grooves 88. The second set of bearing feeding chutes K and L, as previously stated, is identical in construction with the result that the clamping jaws upon each of the work holders G and H are fed with bearings by gravity actuated chutes.

Referring now more in detail to the mechanism for actuating the crossheads and the work holders in timed relation to each other, it will be noted from Figure 4 that I have provided a pair of rockshafts 50 and 51 extending transversely of the machine frame and journaled intermediate the ends thereof within a bearing 52 secured to the top of the partition by means of the bolts 53. The opposite end portions of the rockshafts are journaled within suitable brackets 54 and 55 secured to the partition 23 adjacent the ends of the same. The rockshaft 51 is connected to opposite ends of the work holder G by means of the levers 56 having the inner ends secured to the rockshaft and the outer ends thereof pivotally secured to opposite ends of the work holder G as at 57. One end of the shaft 51 preferably projects laterally beyond the adjacent bearing bracket 54 for receiving a lever 58 having the free end thereof connected as at 59 to a push rod 60. The rockshaft 50 is also provided with a pair of axially spaced levers 61 projecting laterally outwardly from the rockshaft and having the free ends thereof pivotally connected as at 62 to the work holder H adjacent the opposite ends of the same. The end of the rockshaft 50 journaled within the bracket 55 extends laterally outwardly beyond the bracket 55 and has secured thereto a lever 62' which in turn is secured as at 63 to a push rod 64. The foregoing arrangement is such that reciprocation of the push rods 60 and 64 causes the rockshafts 50 and 51 to oscillate and through the intermediary of the levers 56 and 61 effects vertical sliding movements of the work holders G and H. The free ends of the push rods 60 and 64 are pivotally connected to suitable rocker arms 60' and 61' fulcrumed intermediate the ends thereof as at 62'' and having rollers 90 and 91 upon the free ends thereof adapted to engage within cam grooves 92 and 93 formed in the rotatable cams 94 and 95, respectively. The configuration of the cam grooves 92 and 93 is so determined that the work holders G and H will be moved upwardly to position the clamp carried thereby in operative relation to the work feeding mechanism just prior to the time the transfer pins engage the lowermost bearing sections in the feeding mechanism for moving the same axially out of the latter and into operative engagement with the jaws.

The cams 94 and 95 are secured to the outer ends of a suitable crankshaft 96 having an eccentric 97 intermediate the ends and connected by means of the connecting rod 98 to the crosshead B for reciprocating the latter together with the crosshead A due to the connection therebetween as previously described. The connecting rod 98 is formed of two sections 99 and 100 adjustably secured together by means of a coupling 101 having oppositely extending threaded portions engaging respectively in the section 99 and section 100. The arrangement is such as to permit varying the location of the crossheads A and B in accordance with the work formed.

Figure 3:
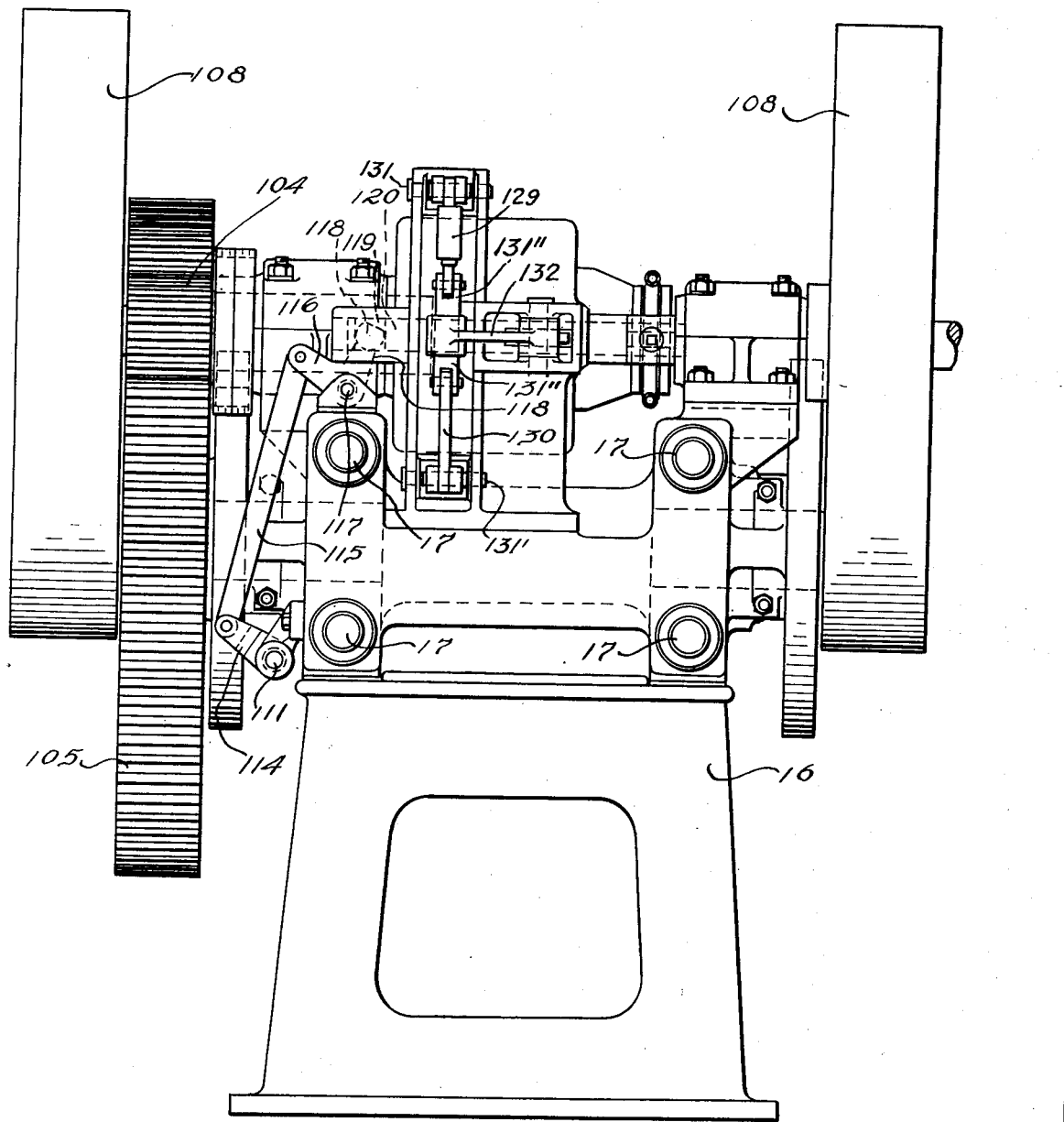
Figure 3 is an end elevation of the machine illustrated in Figure 1.

For rotating the crankshaft 96, I provide a drive shaft 102 extending transversely of the machine in rear of the crankshaft and journaled upon opposite sides of the machine frame as at 103. One end of the drive shaft is connected in any suitable manner to a prime mover and the opposite end of the same is provided with a pinion 104 adapted to mesh with a relatively large gear 105 secured to the crankshaft 96. The pinion 104 is connected to the drive shaft by means of the conventional shear pin 107 which serves to automatically disconnect the drive and crankshafts if, for any reason, rotation of the crankshaft is resisted by an abnormal force. Secured to opposite ends of the drive shaft are suitable inertia members 108 which perform their usual function of balancing the mechanism. The drive shaft is preferably formed of two axially aligned sections adapted to be coupled together by means of a suitable clutch 109 adapted to be manually manipulated by means of a lever 110 located intermediate the ends of the machine. The lever 110 is mounted upon a rockshaft 111 which is journaled adjacent the lever within a bearing 112 secured upon the machine frame and which extends longitudinally of the machine terminating adjacent the rear end thereof. As shown particularly in Figure 3, a suitable lever 114 is secured to the rear end portion of the rockshaft 111 and is pivoted at the free end thereof to an upwardly extending link 115 having the upper end thereof pivotally connected to one arm of a bell crank lever 116. The bell crank lever 116 is pivoted as at 117 to a part of the machine frame and the free arm 118 thereof extends within a suitable slot 119 formed in one end of a reciprocating shaft 120. The shaft 120 is mounted for sliding movement within suitable bearings on the machine and has secured thereto a shifter yoke 121 adapted to engage the movable clutch part 122 for actuating the latter. The foregoing arrangement is such that when it is desired to connect the crankshaft 96 with the source of power, the control lever 110 situated intermediate the ends of the machine is manipulated to rock the shaft 111 which, through the intermediary of the levers and links 114, 115, and 116, reciprocates the shaft 120 to either connect or disconnect the clutch 122 depending upon the direction of movement of the control lever 110.

In order to provide an efficient construction, it is desirable that the parts of the machine come to an immediate rest upon disconnecting the clutch 109. In order to accomplish this result, I provide a suitable brake mechanism 123. The brake mechanism comprises a pair of brake shoes 124 and 125 positioned for engagement with the clutch drum or housing 126 at diametrically opposite sides thereof. Pivotally connected to the shoes 124 and 125 is a pair of levers 127 and 128, respectively, having the free ends thereof pivotally connected to suitable toggle links 129 and 130 and fulcrumed intermediate the ends thereof upon pins 131 and 131' respectively carried by a suitable bracket rigid with the machine frame. The free ends of the toggle links 129 and 130 are pivotally connected to an equalizing link 131'' which in turn is connected to one arm of a bell crank 132. The bell crank 132 is pivotally connected upon the machine and the other arm 133 thereof engages within a suitable opening 134 formed in the reciprocable shaft 120. The construction is such that axial movement of the shaft 120 to disconnect the clutch from the prime mover rocks the bell crank lever 133 in a direction to straighten the toggle links 129 and 130 and thereby rock the free ends of the actuating levers 127 and 128 downwardly causing the shoes connected to the said free ends to grip the brake drum or clutch housing and thereby arrest the portion of the drive shaft beyond the clutch and as a consequence, stop the machine. It is to be understood that the brake drum or clutch housing is rigidly secured to the portion of the drive shaft beyond the clutch. On the other hand, when the clutch mechanism is manipulated to engage the clutch and establish a driving connection from the prime mover to the crankshaft of the machine, the bell crank lever 132 is rotated in an opposite direction to rock the free ends of the levers 127 and 128 outwardly away from the drum and thereby disengage the shoes 124 and 125 from the drum. It will be obvious from the foregoing that I have provided braking mechanism for the machine which is automatically controlled by the manipulation of the clutch between the drive shaft and prime mover.

In Figure 11 of the drawings, I have shown an efficient and practical manner of securing the broaches to the crossheads A and B. In detail, I provide a spindle 140 journaled within the crosshead by means of the thrust bearings 141 engaging opposite sides of an enlargement 142 on the spindle. The forward end of the spindle projects beyond the crosshead and is threaded for detachably receiving the collet nut 143 having a tapered interior surface 144 which serves to actuate the collet jaws 145 to urge the same into gripping relation with the broach F. The entire spindle together with the collet on the forward end thereof is held in assembled relation with the crosshead by means of a single retainer plate 146 secured to the crosshead by means of the fastener elements 147. The arrangement is such as to permit readily removing and inserting the broach retaining means within the crossheads and at the same time to efficiently clamp the broaching members in operative position.

What I claim as my invention is:

1. In a machine of the class described, an elongated substantially horizontal frame, a pair of spaced crossheads mounted for sliding movement longitudinally of said frame, work holding jaws movable vertically relative to the frame between the crossheads, means for delivering work to points in substantially horizontal alignment with the uppermost position of the jaws, means carried by the crossheads for transferring work from the delivery means to the jaws when the latter are in said uppermost position, and broaches carried by the crossheads and engageable with the work in the jaws when the latter are in their lowermost position.

2. In a machine of the class described, an elongated substantially horizontal frame, a pair of spaced crossheads mounted for sliding movement longitudinally of said frame, work feeding chutes mounted upon the frame between said crossheads, broaches carried by the crossheads and movable beneath the chutes, and means for transferring work from the chutes to the broaches, including work clamping jaws movable from a position in horizontal alignment with the lower ends of the chutes to a position in horizontal line with the broaches, and means carried by the crossheads for moving the work from the chutes into the jaws when the latter are in alignment with the lower ends of said chutes.

3. In a machine of the class described, an elongated substantially horizontal frame, a pair of spaced crossheads mounted for sliding movement longitudinally of said frame, a work abutment carried by the frame between said crossheads, work clamping jaws movable vertically upon opposite sides of said abutment, work broaching members carried by the crossheads and movable toward and away from the abutment, means for disengaging the jaws from the work when the members are moved toward the abutment, and means for disengaging the work from the members when the latter move away from the abutment.

4. In a machine of the class described, an elongated substantially horizontal frame, a pair of spaced crossheads mounted for sliding movement longitudinally of said frame, a work abutment carried by the frame between said crossheads, work clamping jaws movable vertically upon opposite sides of said abutment, work broaching members carried by the crossheads and movable toward and away from the abutment, said members being engageable with work in the jaws when they are moved toward the abutment, means for disengaging the jaws from the work after the latter has been engaged by the members, and work abutments between the crossheads and jaws receiving the members and adapted to strip the work from the members when the members are moved away from the first mentioned abutment.

5. In a machine of the class described, an elongated substantially horizontal frame, a pair of spaced crossheads mounted for sliding movement longitudinally of said frame, work feeding chutes mounted upon the frame between said crossheads, work clamping jaws movable vertically relative to the chutes and adapted to receive work therefrom, broaches carried by the crossheads for engagement with the work in the jaws, a driven shaft, and connections between said shaft and jaws and crossheads respectively operable to move the jaws and crossheads in timed relation whereby the jaws will be disengaged from the work while the latter is engaged by the broaches.

6. In a machine of the class described, an elongated substantially horizontal frame, a pair of spaced crossheads mounted for sliding movement longitudinally of said frame, work feeding chutes mounted upon the frame between said crossheads, work clamping jaws movable vertically relative to the chutes and adapted to receive work therefrom, broaches carried by the crossheads for engagement with the work in the jaws, a driven shaft, a driving connection between said shaft and jaws operable to disengage the jaws from the work while the latter is engaged by the broaches, a driving connection between said shaft and crossheads, and means carried by the crossheads and operable after the jaws have been disengaged as aforesaid to move work from the chutes into the jaws.

7. In a machine of the class described, an elongated substantially horizontal frame, a pair of spaced crossheads mounted for sliding movement longitudinally of said frame, work feeding chutes mounted upon the frame between said crossheads, work clamping jaws movable vertically relative to the chutes and adapted to receive work therefrom, broaches carried by the crossheads for engagement with the work in the jaws, a driven shaft, a driving connection between said shaft and jaws operable to disengage the jaws from the work while the latter is engaged by the broaches, a driving connection between said shaft and crossheads, and means between the crossheads and operable during movement thereof for disengaging the work from the broaches.

8. In a machine of the class described, an elongated substantially horizontal frame, a pair of spaced crossheads mounted for sliding movement longitudinally of said frame, work feeding chutes mounted upon the frame between said crossheads, vertically movable jaws adjacent the chutes, means carried by the crossheads for moving work from the chutes into the jaws, broaches carried by the crossheads for removing work from the jaws, and means operable when the crossheads are in a predetermined position for stripping work from the broaches.

9. In a machine of the class described, an elongated frame, a work abutment carried by the frame, work clamping jaws upon opposite sides of the abutment and movable in planes at substantially right angles to the frame, work broaching members movable longitudinally of the frame toward and away from the abutment, said members being engageable with work in the jaws when they are moved toward the abutment, means for disengaging the jaws from the work after the latter has been engaged with the members, and means associated with the abutment for disengaging the work from the members when they are moved away from the abutment.

10. In a machine of the class described, an elongated frame, a work abutment carried by the frame, work clamping jaws upon opposite sides of the abutment and movable in planes at substantially right angles to the frame, work broaching members movable longitudinally of the frame toward and away from the abutment, said members being engageable with work in the jaws when they are moved toward the abutment, means for disengaging the jaws from the work after the latter has been engaged with the members, and other abutments receiving the members and adapted to strip the work from the members when said members are moved away from the first mentioned abutment.

11. In a machine of the class described, a frame, a partition on the frame, guides carried by the partition, and work holders reciprocable beside the partition relative to the frame and including a pair of spaced plates, spacers between and secured to said plates, certain of said spacers having tongues slidably engaging the guides carried by said partition.

12. In a machine of the class described, a frame, a partition on the frame, guides carried by the partition, and work holders reciprocable beside the partition relative to the frame and including a pair of spaced plates, work clamping jaws between and pivotally connected to said plates, spacers for said plates having portions slidably engaging said guides, and means holding said jaws in a predetermined position relative to the plates including means associated with said jaws and spacers.

13. In a machine of the class described, an elongated frame, crossheads spaced apart longitudinally of the frame and movable longitudinally of the frame, work clamping jaws movable between said crossheads in planes at substantially right angles to the frame, work broaching members carried by said crossheads and engageable with work in the jaws, a rotary shaft, an operating connection between said shaft and crossheads, and an operating connection between said shaft and jaws.

14. In a machine of the class described, an elongated frame, crossheads spaced apart longitudinally of the frame and movable longitudinally of the frame, work clamping jaws movable between said crossheads in planes at substantially right angles to the frame, work broaching members carried by said crossheads and engageable with work in the jaws, a rotary shaft, and means associated with the frame for actuating the jaws and crossheads in timed relation to each other.

15. In a machine of the class described, an elongated frame, crossheads spaced apart longitudinally of the frame and movable longitudinally of the frame, work clamping jaws movable between said crossheads in planes at substantially right angles to the frame, work broaching members carried by said crossheads and engageable with work in the jaws, a rotary shaft, a crank shaft, cams carried by said shaft, driving connections between said jaws and shaft including means engaging said cams, a connection between said crossheads, and a connection between one of said crossheads and a crank portion of said shaft.

16. A broaching machine having in combination, an elongated frame, a pair of spaced crossheads movable in unison longitudinally of the frame, work broaching members extending inwardly from the inner sides of said crossheads, and means between said crossheads and movable in a plane at substantially right angles to the frame in timed relation to the reciprocation of the crossheads for positioning work in operative relation to said broaches.

17. In a machine of the class described, an elongated substantially horizontal frame, a driven shaft carried by the frame, a pair of crossheads spaced apart longitudinally of the frame and movable longitudinally of the frame, a connection between said crossheads causing the same to move in unison, work holders movable between and in a plane substantially at right angles to the line of movement of the crossheads, and mechanism carried by the frame for actuating the crossheads and the work holders in timed relation to each other.

18. In a machine of the class described, a pair of substantially parallel stationary work abutments, a work clamping jaw movable between and in a line parallel to said abutments, a work broaching member movable in a line substantially at right angles to the line of movement of the work clamping jaw through one of the abutments toward and away from the other of said abutments, said member being arranged to remove work from the jaw when moving toward the second abutment and to subsequently support the same, means for moving the jaw from the line of movement of the broaching member after the work is supported by said member, and means for moving the member away from the second abutment and relative to the first abutment so that the work supported by the member will be stripped therefrom.

19. In a machine of the class described, a pair of substantially parallel work abutments, a work clamping jaw movable between and in a line parallel to said abutments, a work broaching member movable in a line at right angles to the line of movement of the jaw through one of the abutments toward the second abutment to engage work in the jaw between said abutments, said member being arranged to remove work from the jaw when moving toward the second abutment and to subsequently carry the same, means for moving the jaw away from said member, and means for moving said member away from the second abutment so that the work carried thereby will be engaged with the first abutment and stripped thereby from said member.

20. In a machine of the class described, a partition member, a reciprocating crosshead movable toward and away from one side of said partition member, a work clamping jaw movable beside the partition member in a plane at substantially right angles to the plane of movement of the crosshead, a work broaching member carried by the crosshead and arranged to move work from the jaw and to subsequently carry the same toward the partition member, and means operable when the broaching member is moved away from said partition member to strip the work from said member.

21. In a machine of the class described, an elongated substantially horizontal frame, crossheads spaced apart longitudinally of the frame and adapted to move longitudinally of said frame, a driven shaft carried by the frame, an eccentric on said shaft, a connecting rod terminally connected to the eccentric and to one of said crossheads for reciprocating the latter, and an operating connection between said crossheads causing the same to move in unison, including a connecting rod having a portion that is adjustable to permit varying the location of the crossheads relative to said frame.

22. In a machine of the class described, an elongated frame, longitudinally aligned crossheads connected together and movable longitudinally of said frame, broaching members projecting from said crossheads, a partition extending transversely of the frame intermediate said crossheads, bumper plates upon opposite sides of the partition and having parts for engagement by the free ends of the broaching members, stripper plates spaced from the sides aforesaid of the bumper plates and having openings in alignment with the parts aforesaid of said bumper plates to permit passage therethrough of the broaching members, and work holders mounted for movement between the stripper plates and partition and movable in timed relation to the crossheads and broaching members aforesaid.

23. In a machine of the class described, a pair of substantially parallel work abutments, a work clamping jaw movable between said abutments, a work broaching member movable through one of the abutments toward and away from the other of said abutments, said member being arranged to remove work from the jaw when moving toward the second abutment and to subsequently support the same, means for moving the jaw from the line of movement of the broaching member after the work is supported by said member, and means for moving the member away from the second abutment and relative to the first abutment so that the work supported by the member will be stripped therefrom.

24. In a machine of the class described, a pair of substantially parallel work abutments, a work clamping jaw movable between said abutments, a work broaching member movable through one of the abutments toward the second abutment to engage work in the jaw between said abutments, said member being arranged to remove work from the jaw when moving toward the second abutment and to subsequently carry the same, means for moving the jaw away from said member, and means for moving said member away from the second abutment so that the work carried thereby will be engaged with the first abutment and stripped thereby from said member.

GEORGE F. YAGER.